United States Patent
Van Der Gouwe

(10) Patent No.: US 6,785,362 B1
(45) Date of Patent: Aug. 31, 2004

(54) METHOD AND APPARATUS FOR CHECKING THE FUNCTIONALITY OF A SWITCHING CENTER

(75) Inventor: Pieter Van Der Gouwe, Grossostheim (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/762,839
(22) PCT Filed: Aug. 6, 1999
(86) PCT No.: PCT/DE99/02458
  § 371 (c)(1),
  (2), (4) Date: Apr. 9, 2001
(87) PCT Pub. No.: WO00/10313
  PCT Pub. Date: Feb. 24, 2000

(30) Foreign Application Priority Data

Aug. 12, 1998 (DE) .......................... 198 36 560

(51) Int. Cl.[7] .......................... H04M 1/24; H04M 3/08; H04M 3/22
(52) U.S. Cl. .......................... 379/9.01; 379/1.01; 379/9; 379/15.01; 379/26.01
(58) Field of Search .......................... 379/1.01, 9, 9.01, 379/14, 10.03, 15.01, 16, 22, 22.01, 22.04, 26.01, 32.01, 32.02; 370/241, 241.1, 250, 251; 455/424

(56) References Cited

U.S. PATENT DOCUMENTS

| | | | | |
|---|---|---|---|---|
| 5,375,159 A | * | 12/1994 | Williams ...................... | 379/23 |
| 5,726,972 A | * | 3/1998 | Ferguson ...................... | 370/13 |
| 5,787,147 A | * | 7/1998 | Gundersen .............. | 379/10.01 |
| 5,912,946 A | * | 6/1999 | Michelson ................. | 379/1.01 |
| 5,970,120 A | * | 10/1999 | Kasrai ........................... | 379/9 |
| 6,047,045 A | * | 4/2000 | Bauer et al. ............. | 379/15.01 |
| 6,173,244 B1 | * | 1/2001 | Pyritz .......................... | 703/20 |
| 6,230,006 B1 | * | 5/2001 | Keenan et al. ............. | 455/424 |
| 6,301,336 B1 | * | 10/2001 | Branton, Jr. et al. ..... | 379/29.01 |

FOREIGN PATENT DOCUMENTS

| | | |
|---|---|---|
| DE | 44 26 739 C2 | 2/1996 |
| EP | 0 435 448 A2 | 7/1991 |
| EP | 0 840 530 A2 | 5/1998 |
| WO | WO 96/16515 | 5/1996 |
| WO | WO 96/16516 | 5/1996 |
| WO | WO 97/11563 | 3/1997 |

* cited by examiner

*Primary Examiner*—Quoc Tran
(74) *Attorney, Agent, or Firm*—Bell, Boyd & Lloyd LLC

(57) ABSTRACT

In order to check the functionality of a switching center (VST) which is to be tested in a telecommunications network in which user information on the subscriber connections is interchanged via intermediate interfaces (NK1, NK2) with a respectively connected switching center, and signaling messages for controlling the subscriber connections and for administration of the intermediate interfaces (NK1, NK2) are interchanged via signaling interfaces (SSS), original signaling messages which have been transmitted from the switching center (VST) and in which the switching center (VST) is stated as the source point are received, the original signaling messages are each converted in accordance with a predetermined rule into signaling messages in which the switching center (VST) is stated as the destination point, and the signaling messages which have been converted in this way are sent to the switching center (VST). The intermediate interfaces (NK1, NK2) are advantageously looped through in a corresponding manner to the switching centers which are associated with one another in the converted messages. The checking functions can be provided internally in a switching center (VST) or in a device (CLG) for checking the functionality of the switching center.

12 Claims, 2 Drawing Sheets

METHOD AND APPARATUS FOR CHECKING THE FUNCTIONALITY OF A SWITCHING CENTER

The invention relates to a method for checking the functionality of a switching center which is to be tested, can be used to produce subscriber connections in a telecommunications network and has at least two switching connections to which switching centers can be connected and in each of which an intermediate interface is provided for interchanging user information on the subscriber connections with a respectively connected switching center, and has at least one signaling interface via which signaling messages for controlling the subscriber connections and for administration of the intermediate interfaces are interchanged, with each signaling message having details relating to its source and destination switching center.

The invention also relates to a device for checking the functionality of a switching center, which is to be tested, for producing subscriber connections in a telecommunications network.

The invention relates in the same way to a switching center which can be used to produce subscriber connections in a telecommunications network and has at least two switching connections to which switching centers can be connected and in each of which an intermediate interface is provided for interchanging user information on the subscriber connections with a respectively connected switching center, and has at least one signaling interface via which signaling messages for controlling the subscriber connections and for administration of the intermediate interfaces are interchanged, with each signaling message having details relating to its source and destination switching center.

Telecommunications networks, in particular telephone networks, have switching centers which are networked with one another and are used for setting up and maintaining call collections between the subscribers in a network. The switching centers in modern telecommunications networks are automated devices which comprise a number of components, for example one or more switching networks, a central controller, line trunk groups, etc. Switching centers communicate with one another by means of specific inter-exchange signals for controlling and monitoring the switching processes and the services carried out, and for administration of the connections and connecting lines. Usually, these signals are interchanged in the form of signaling messages which are interchanged between the switching centers via dedicated channels, which are not the same as the user channels, and whose form depends on the respectively used protocol. One example of such an inter-exchange protocol is the so-called Signaling System No. 7 or, in short, CCS7 ('Common Channel Signaling System No. 7') in accordance with International Telecommunications Union (ITU) standards Q.700 to Q.716. In CCS7, the interchanging of signaling messages is associated with a dedicated central channel network.

Owing to the stringent requirements on a switching center during operation, the switching functions must be checked before the switching center is brought into use, expediently even before the switching center device is linked to the network, in order to avoid any risk of a serious adverse effect on network operation from the start, or even before the switching center is delivered. The realistic testing of a switching center means that the switching center which is to be tested must be embedded in a network environment which is sufficiently large to satisfy the test requirements. Since it is impossible to embed the switching center in a real network during the checking process, the network—to be more precise the partner switching centers connected to that switching center—must be simulated by test equipment. This test equipment is in each case used to simulate one or more partner switching centers. However, in order to simulate a realistic network, for example a network having several hundred to thousand switching centers, a very large number of test equipment items would thus be required, which it has not been possible to provide because of the costs associated with this, and control difficulties. Thus, in the past, realistic tests have not normally been carried out in large network configurations.

The object of the invention is to allow a realistic check of the functionality of a switching center using simple means and with the capability to control the switching center in a simple manner and, in particular, with it being possible to simulate an extensive network.

The object is achieved by a method of the type mentioned initially in which, according to the invention, original signaling messages which have been transmitted from the switching center which is to be tested and in which the switching center which is to be tested is stated as the source point are received, the original signaling messages are each converted in accordance with a first predetermined rule into signaling messages in which the switching center which is to be tested is stated as the destination point, and the signaling messages which have been converted in this way are sent to the switching center which is to be tested.

This solution solves the set object in a simple manner and, in particular, there is no need to provide a number of test equipment items and to connect them to the switching center which is to be tested.

In one preferred embodiment of the method according to the invention, in order to reduce the number of signaling interfaces, the converted signaling messages are each sent to the switching center which is to be tested via that signaling interface via which the associated original signaling message was received.

Advantageously, a switching center which is uniquely associated with the destination point of the associated original signaling message is stated as the source point in each of the converted signaling messages.

In this case, it is expedient for a clearly understandable test operation for the switching centers which are stated in the signaling messages to be associated with one another in pairs and for the switching center which is associated with the destination point of the original signaling message to be stated as the source point in the converted signaling message.

For simple implementation of the associated pairs, it is in this case advantageous for the addresses of the mutually associated switching centers to be determined from one another by means of an inversion operation.

It is furthermore expedient for simple implementation of a test layout for each of those intermediate interfaces which are logically associated with mutually associated switching centers to be looped through.

The invention has been found to be particularly advantageous if the signaling interface is connected to a signaling network which is independent of the intermediate interfaces since, in this case, separate handling of the interfaces can be utilized.

In order to allow both associated and quasi-associated signaling processes to be tested, it is possible, in a further advantageous embodiment, in addition, for signaling messages, in which source and destination points which differ from the switching center which is to be tested are stated, to be produced and to be sent to the switching center which is to be tested, and for signaling messages, which have been transmitted from the switching center which is to be tested and in which source and destination points which differ from the switching center which is to be tested are stated, to be received and to be checked to determine whether they match previously sent signaling messages.

Furthermore, the object stated above is achieved, based on a device for checking the functionality of a switching center which is to be tested, by a device having a signaling interface to which the switching center which is to be tested can be connected and which is set up for interchanging signaling messages between switching centers for controlling subscriber connections and for administration of the intermediate interfaces which connect the switching centers, with each signaling message having details relating to its source and destination switching center, having a device for transmitting and receiving signaling messages via the signaling interface or interfaces, and having a converter device whose output is supplied to the transmitting/receiving device and to which signaling messages which have been received by the transmitting/receiving device can be supplied, for conversion of original signaling messages in accordance with a first predetermined rule into converted signaling messages in each of which the source point of the original signaling message is stated as the destination point.

This device allows the testing of switching centers according to the invention, including their advantages as described further above.

One advantageous embodiment of the device according to the invention, which also allows the production and reception of signaling for conversion of signaling messages, contains a message source whose output is supplied to the transmitting/receiving device, in order to produce signaling messages in which source and destination points which differ from the switching center which is to be tested are stated, a message sink for receiving signaling messages and/or for evaluating them to determine whether they match previously sent signaling messages, and a discriminator device to which signaling messages which have been received by the transmitting/receiving device can be supplied, for assigning the signaling messages to subsequent devices which process messages, such as the converter device and the message sink, in accordance with a second predetermined rule, which differs from the first rule, using the contents of the relevant signaling message.

The object stated above is equally achieved by switching of the type described initially, which has a converter device for conversion of original signaling messages in accordance with a first predetermined rule into converted signaling messages in each of which the source point of the original signaling message is stated as the destination point, and a rerouting device for rerouting signaling messages which are to be sent as original signaling messages from the signaling interface to the converter device, and for rerouting signaling messages which have been converted in the converter device as signaling messages which arrive at the switching center to the signaling interface.

This solution allows the switching to be tested without the use of any additional equipment, and once again with the capability to achieve the advantages mentioned further above.

One particularly advantageous embodiment of the switching according to the invention, which also allows simulation of the production and reception of signaling, contains a message source whose output is supplied to the rerouting device for producing signaling messages in which source and destination points which differ from the switching center which is to be tested are stated, a message sink for receiving signaling messages and/or for evaluating them to determine whether they match previously sent signaling messages, and a discriminator device to which signaling messages which have been rerouted by the rerouting device can be supplied, for assigning signaling messages to subsequent devices which process messages, such as the converter device and the message sink, in accordance with a second predetermined rule, which differs from the first rule, using the contents of the relevant signaling message.

The invention will be explained in more detail in the following text with reference to an exemplary embodiment which deals with the testing of a telephone switching center for a CCS7 network. The attached drawings are used for this purpose in which, on the basis of schematic illustrations:

Figure 1:
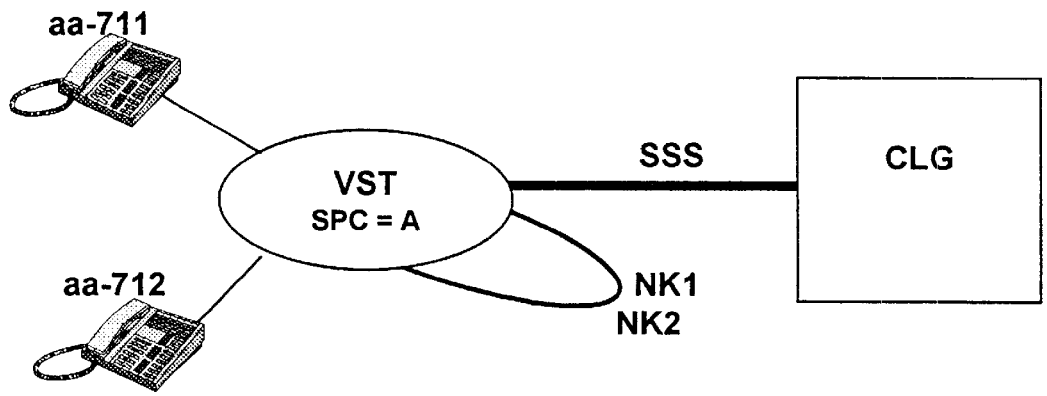
FIG. 1 shows an arrangement for testing telephone switching.

The exemplary embodiment relates to the testing of telephone switching which is designed for inter-exchange signaling based on the CCS7 system. The CCS7 system is distinguished by the signaling information for the inter-exchange signaling being transmitted separately from the user channels, via which user information for the subscriber connections is interchanged and which, in the example, are thus voice channels, and to which the signaling information relates, via special signaling interfaces which are used jointly for a large number of user channels. The signaling interfaces, which are also referred to as central signaling channels, between the switching centers together form an autonomous signaling network which is based on the principle of subsection switching and is separate from the user channel switching network.

Interactions between switching network and user channel network only ever occur, in the course of setting up a user connection in sections, in those switching centers in which application-oriented processing is carried out, including the production of signaling messages. These end points—a source point producing the message and a destination point receiving the message—of a signaling relationship are referred to as signaling end points (SP, 'Signal Point'). Intermediate switching centers which pass on the signaling messages on the signaling path between the source point and the destination point without any processing are called signaling transfer points (STP, 'Signal Transfer Point'). Depending on the relevant message, one and the same switching center may act as the signaling end point or signaling transfer point.

Each switching center within the telecommunications network or the signaling network is assigned a point code (SPC, 'Signaling Point Code') for unique identification and addressing. In the signaling messages, the point code is used to indicate the source point and the destination point of the relevant message. For this purpose, each signaling message has an address field with a source code (OPC, 'Originating Point Code') and a destination code (DPC, 'Destination Point Code') which, together with other information in the address field, is used for controlling the message routing.

At this point, it should be mentioned that the invention does not relate solely to CCS7 switching systems but can be applied to switching systems for signaling systems which use inter-exchange signaling which is at least logically separate from user channels. In this case, it is of secondary importance to the invention whether the signaling channels intended for inter-exchange signaling differ from the user channels, or even form their own signaling network. A precondition of the invention is centralized handling of the signaling information and transmission of this information via signaling interfaces. In this case, it is irrelevant whether the signaling interfaces are, for example, in the form of dedicated physical connections or, for example, are part of an intermediate interface with user channels of which specific channels are permanently or temporarily used as signaling channels.

FIG. 1 shows the switching center VST which is to be tested and has a signaling interface SSS which is connected to a message converter which is referred to in the following text as a load converter CLG ('Converting Load Generator'). The switching center VST is assigned a point code, which will be reproduced here symbolically as A.

The load converter CLG may, for example, be in the form of an autonomous device which, for testing the switching center VST, is connected via its signaling interface SSS.

It is likewise possible for the load converter CLG to be in the form of the switching center VST. In this case, the load converter CLG may be provided by means of additional components in the switching center and/or as an additional program running on the hardware platform offered by the switching center VST. In this case, the load converter CLG may also use signaling functions which already exist in the switching center VST; this then advantageously also results in a corresponding improvement or change in the behavior of the load converter, for example in the event of an improvement or change in operation of the switching center, for example an upgrade with a new function version. The load converter implemented in the switching center VST is activated, for example, by means of a switch or by a specific instruction; at the same time, the signaling interface SSS is rerouted, for example via a switch, from the outer interface connection to the load converter so that all the inter-exchange signaling on the signaling interface SSS to and from the load converter CLG takes place during the test process. If the load converter CLG is in the form of a program, it can be activated, for example, via so-called patches, that is to say cross-references and/or rerouting instructions to otherwise quiescent code—the code for carrying out the load converter functions—in the instruction memory of the load converter platform, or by means of instructions which are entered via a control interface, for example via a man-machine interface or a Q3 interface of a telecommunications management network (TMN).

During the test process, the user interfaces NK1, NK2 which are used to provide the user channels are looped through; in the exemplary embodiment described here, this can be done, for example, by means of cable connections fitted to the switching center. In another embodiment, the process of looping the user channels through can also be carried out, provided this is possible, by internal rerouting in the switching center, for example by means of the already mentioned switch or by a specific instruction.

In addition, one or more terminals, for example two telephones, can be connected to the switching center VST for the test. The connection of terminals is unnecessary for testing, for example, transit switching. The connected terminals are given dedicated call numbers, for example aa-711 and aa-712, with the prefix aa symbolizing the dialing code for a call number zone associated with the switching center.

Any desired number of terminals and user or intermediate interfaces may be connected during the test. The restriction to two terminals aa-711, aa-712, two user interfaces NK1, NK2 and one signaling interface SSS in the exemplary embodiment described here is intended only to simplify the description of the invention. In other test configurations, far more end connections and intermediate interfaces may be provided; in practice, there will be a large number of intermediate interface loops, in particular, in order to simulate a large number of neighboring switching centers. In this case, it is also possible to loop through some or all of the end connections. A major advantage of the invention is that a large number of switching centers can be simulated by means of a single load converter. Furthermore, for test purposes, it is also possible to simultaneously test a number of switching centers which can be connected to one another via intermediate interfaces and signaling interfaces, while the remaining interfaces are supplied by load converters according to the invention, which simulate the switching centers being embedded in a larger network. However, per se, the load converter CLG advantageously has no interfaces for user channels.

The fundamental principle of the load converter CLG according to the invention is based on the conversion of the signaling messages transmitted from the switching center VST which is to be tested. According to the invention, the signaling messages in which the switching center VST which is to be tested is stated as the source point are each converted into signaling messages in which the switching center VST which is to be tested is stated as the destination point, and the signaling messages which have been converted in this way are sent to the switching center VST which is to be tested.

Figure 2:
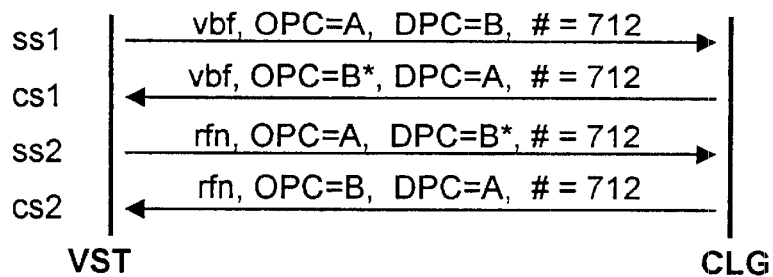
FIG. 2 shows a message interchange during the production of a subscriber connection.

FIG. 2 shows an example of a message interchange between the switching center VST which is to be tested and the load converter CLG shown in FIG. 1. The message sequence illustrated is based, as an example, on a situation in which the subscriber aa-711 wishes to make a telephone call to a subscriber bb-712 in another call number zone bb. This call request can be entered on the terminal aa-711 by the test personnel for example by dialing the desired number bb-712. The switching center VST thus sends a signaling message ss1 with a connection request vbf for a call connection via the signaling interface SSS to the load converter CLG. The signaling message contains, as details of the connection request, in addition to the point code A of the switching center VST as source code OPC, the call number of the desired subscriber 712 and, as the destination code DPC, the point code B of the switching center supplying the call number zone bb. The load converter receives the signaling message ss1 and converts it by interchanging the source code and the destination code with one another additionally by inverting the new source address to form the point code B*. The inversion can be carried out, for example, by bit-by-bit inversion (one's complement) of the point code B. The converted signaling message cs1 obtained in this way is sent to the switching center VST via the same signaling interface SSS via which the original message ss1 was transmitted.

Figure 3:
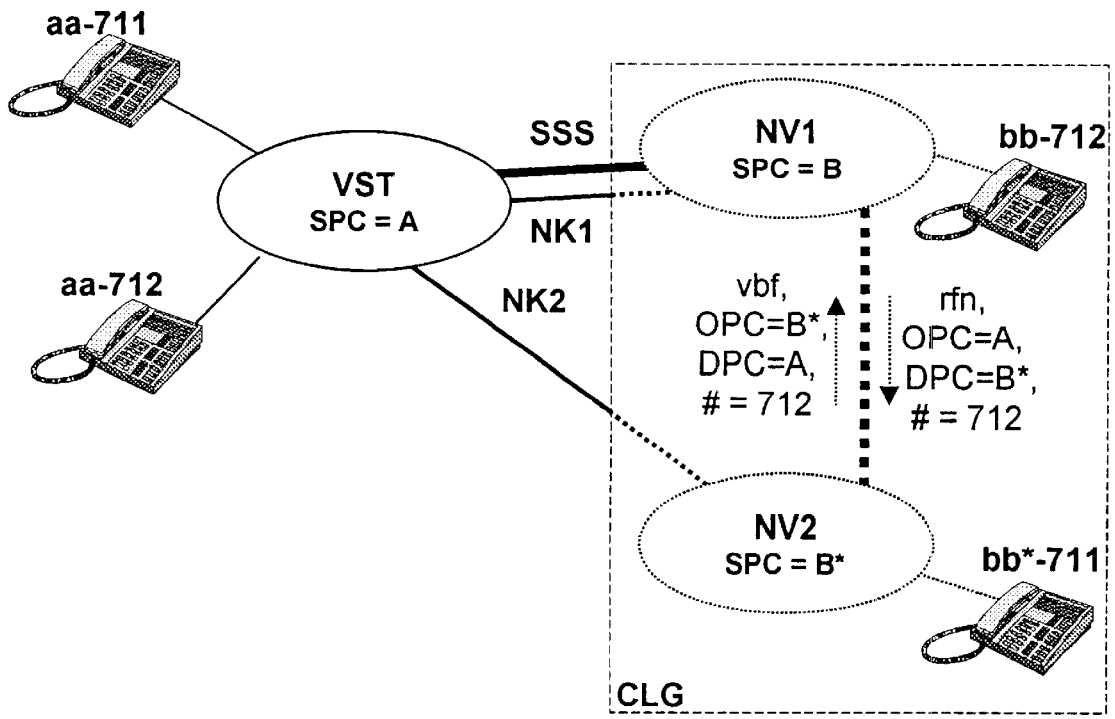
FIG. 3 shows the network configuration simulated for the message interchange shown in FIG. 2.

For the switching center VST, the converted message cs1 corresponds to a call request from a further switching center with a point code B*, whose subscriber 711 is calling its own subscriber aa-712. FIG. 3 shows the network configuration which is simulated by the load converter CLG for the message sequence in FIG. 2. The load converter simulates the functions of the switching center NV1 with the point code B, and at the same time simulates a second, simulated switching center NV2 with the point code B*. As seen by the switching center VST which is to be tested, the signaling with the first simulated switching center NV1 takes place directly (so-called associated signaling), while the second simulated switching center NV2 signals via the first simulated point NV1 as a transfer point (so-called quasi-associated signaling) as if there were a signaling interface between the two simulated points NV1, NV2 via which signaling interface the messages are passed from (and to) the second simulated point NV2. In this way, the invention implicitly allows simulation of associated and quasi-associated signaling.

On the basis of the received message cs1 with a connection request, the switching center sets up the appropriate connection to the subscriber aa-712 and, finally, sends a signaling message ss2 with a call acceptance rfn for this subscriber with the destination code B*, that is to say to the switching center NV2.

This message is now converted in the same way as for the first signaling message ss1; the inversion now results in the point code B of the first simulated switching center NV1 being recovered in the converted message cs2. At the same time, the setting up of a connection to the subscriber bb-712 is simulated.

In order to allow the user channel functions which are controlled by the signaling messages to take place correctly, the simulated switching centers NV1, NV2 expediently have associated user interfaces NK1, NK2, which are looped through as appropriate. In conjunction with the message conversion, this measure now apparently—as seen by the switching center VST—results in a connection between the subscribers aa-711 and bb-712, and also a second connection between the subscribers bb*-711 and aa-712; in fact, there is a connection between the subscribers aa-711 and aa-712 via the user channel loop NK1, NK2, and these two subscribers can talk to one another. The test personnel can thus easily use the call which has been set up to determine whether the signaling is taking place correctly.

On the basis of the invention, a converted signaling message cs1, cs2 is sent back to the switching center VST for each signaling message ss1, ss2 which is sent from the switching center VST which is to be tested to a switching center NV1 which has been simulated by the load converter CLG. The mirroring of the information interchange in the form of messages on inversion of the point code results in complete reversal of the message dialogue between the source and destination switching centers, without the original message dialogue being interfered with by the converted messages. Even the occurrence of fault events in the subscriber connections, for example a defect in the terminal 712 can be checked for correct handling in the switching center.

In this context, it should be mentioned that any operation which supplies the original result when applied twice can be used as the inversion operation for the invention for determining the second point code B* from the first point code B. Thus, in addition to the one's complement which has been mentioned, it is possible to use, for example, the two's complement, formation of the complement of only specific, defined bits in the code, reversal of the bit sequence, a table with associated pairs, etc.

If signaling messages for other simulated switching centers occur, then the load converter in each case uses the inversion to simulate an additional switching center, that is to say, overall, twice as many switching centers. This has the advantage of determining the point code of the converted signaling message from the point code of the original signaling message since, in this way, one load converter CLG can simulate a very large number of switching centers. The implementation of associated pairs of point codes by means of an inversion operation makes it possible to loop through the user interfaces, to be precise in each case those user interfaces which are logically associated with mutually associated point codes or simulated switching centers.

From what has been said above, it is directly of interest that any possible subsequent message traffic, for example when clearing connections, is also handled correctly by the load converter CLG according to the invention, in such a way that the switching functions can be checked in the process.

For completeness, it should be mentioned that, in order to implement the sequence described above, dialing code conversion must be set up so that the dialing codes aa and bb or bb* (which need not necessarily be different) are converted to one another. The dialing code conversion is normally carried out in the switching center; in special cases it can also be carried out in the load converter.

The load converter CLG uses the signaling messages of the switching center VST which is to be tested to obtain the information required for the simulation process and relating to the switching centers NV1, NV2 which are to be simulated. There is thus no need for any programming of the load converter CLG, and all that is necessary is to configure the switching center VST which is to be tested for operation with the (simulated) test network, and to set up the access connections, that is to say the intermediate interface or interfaces SSS, the looped-through user interfaces and, possibly, the subscriber connections. Additional information which is required, for example, by the load converter for producing or receiving messages, can be obtained by the load converter CLG from, for example, the initialization messages which, in accordance with ITU Recommendation Q.707, are interchanged between adjacent switching centers on activation of the user interfaces.

Figure 4:
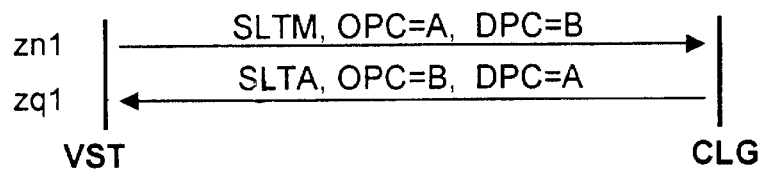
FIG. 4 shows a message interchange for initialization of the network configuration to be simulated in FIG. 3.

FIG. 4 shows a signaling sequence with initialization messages for initialization of the network layout shown in FIG. 3. In this case, the switching center VST to be tested sends an intermediate interface initialization message zn1 ('signaling link test message', SLTM) with the point code B as the destination code via the signaling interface. The load converter CLG receives the message zn1 and uses it to determine configuration information which is required for correct production and/or processing of signaling messages in the simulated network; in the process, the load converter takes and stores, for example, the point code A of the switching center VST which is to be tested from the source code OPC, the point code B which is processed as the point code of a switching center which is to be simulated, together with other information such as a network indicator, from the destination code DPC. Furthermore, the load converter CLG acknowledges the message with an intermediate interface initialization acknowledgement zq1 ('signaling link test message acknowledgement', SLTA). At the same time, the load converter CLG stores the information on the initialization messages, for further operation.

The stored point code B allows the load converter CLG to simulate the switching center NV2 with the point code B* as well. In this case, it should be noted that, in addition to the data obtained from initialization messages, data entered by the test personnel can also of course be used for further operation, for example relating to the associated or quasi-associated signaling for simulated switching centers NV1, NV2.

The advantage of inversion of the point codes of simulated switching centers is evident in this example as well. There is no need to enter specific data, such as point codes, in the load converter CLG; in fact, the load converter determines such information from the received messages, in this case from the initialization message zn1. Obviously, it is necessary to ensure that, in the process of configuring the network connections from the switching center VST which is to be tested to each neighboring switching center having a point code B, a further switching center with a corresponding point code B*, which is assigned via an inversion operation, is always set up.

Figure 6:
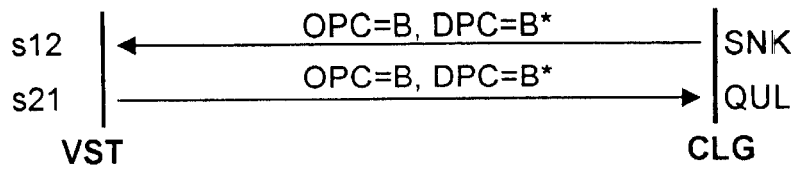
FIG. 6 shows a message interchange in which the switching acts as a signaling transfer point.

If the load converter CLG is intended to produce and receive signaling messages, a source and a sink for signaling messages must be provided in order firstly to produce messages whose destination code is a point code of a simulated switching center and to send them to the switching center VST which is to be tested and, secondly, in order to receive the messages which have been passed on from the switching center, to evaluate them and, for example, to report on the success of this transmission. FIG. 6 shows an overview of the functional layout of the load converter CLG. If the load converter CLG is in the form of a dedicated device, the transmitting/receiving device SEE carries out the transmission and reception of the signaling messages to and from the signaling interface SSS. As is described in more detail below, the transmission takes place via the data link layer DLL of the protocol layer architecture according to ITU Recommendation Q.703 as used in the exemplary embodiment.

For the received signaling messages, a discriminator DIS decides which of the following components the relevant message will be passed to. This decision is made on the basis of the information in the message, in particular the source and destination codes, using the stored configuration information. For example, it is possible for all initialization messages—such as the message zn1 in FIG. 4—and other network control messages to be passed to network administration NWV where the relevant messages are evaluated and acknowledgement messages—for example message zq1 in FIG. 4—are produced. The network administration can also be set up to determine the configuration information.

Signaling messages with a source code of a simulated switching center and with a destination code of a simulated switching center are supplied, for example, to the message sink SNK, where these messages are evaluated. Since the switching center which is to be tested was the transfer point for these messages, a check is carried out to determine whether the contents and time of the received message are correct with reference to the signaling messages produced in the message source QUL of the load converter, or whether they indicate a fault in the operation of the switching which is to be tested. The destination and source codes used in the signaling messages of the message source QUL may have been obtained from initialization messages zn1 (see the above discussion relating to FIG. 4) or may have been entered by the test personnel.

The other signaling messages are supplied to a converter device CNV which carries out the message conversion described with reference to FIG. 2, and passes the converted messages to the transmitting/receiving device SEE. In this case, the conversion of the messages can be carried out in various ways depending on the setting or programming of the converter device CNV, for example with regard to the settings, whether the destination and source codes are interchanged, whether inversion is carried out and in accordance with which inversion rule, or else the destination code and/or the source code is left unchanged, how, if desired, other information is handled and/or converted etc., in which case it is also possible to provide for these rules to depend on the contents of the relevant message. In a situation where the load converter is controlling a number of signaling interfaces, the rules may be set, as required, for example for all the interfaces, or for each individual interface.

All the messages produced in the load converter CLG, irrespective of whether they are produced by the network administration NWV, by the converter device CNV or by the source QUL, are passed to the transmitting/receiving device SEE, which passes the messages via the signaling interface SSS to the switching center VST which is to be tested.

It is thus possible for the load converter not only to handle signaling messages for which the switching center VST is the signaling end point, but also to produce signaling traffic for the switching center VST as the transfer point, to send this via the signaling interface SSS, to receive it and to evaluate it. Particularly if the load converter CLG is operated, for example, on a platform on which signaling messages are handled, for example, using a CCS7 system, the source and sink functions can be implemented with little complexity.

FIG. 6 shows a signaling sequence in which the switching center which is to be tested is used as a signaling transfer point. In this case, a signaling message s12, which is directed from one simulated switching center to a second, is generated in the message source QUL of the load converter and is sent to the switching center VST which is to be tested, and a check is carried out to determine whether the latter sends the message back correctly, and the message s21 which has been sent back from the switching center VST and is intended to be identical to the original message s12, is received and tested. In this case, the configuration information obtained from the initialization messages can be used for producing and subsequently checking the messages; in some circumstances, routing information which is contained in the messages s12, s21 can also be used to select particular routes via other signaling interfaces, which are not shown in the drawings. The choice of different signaling routes, to be more precise, different signaling interfaces, for the original message s12 and the message s21 which has been sent back is necessary, for example in the CCS7 system, since, in this case, messages which are to be sent back via the same interface or neighboring switching center would be identified and rejected as a "ping-pong" message.

In the exemplary embodiments of the load converter CLG, the transmitting/receiving device SEE which exists in the switching center VST can be used by the CLG as the application program for the software platform of the switching center VST which is to be tested. The program is activated, for example, by means of the 'patches' described above. Those protocol layers which are above the data link layer are replaced by the software associated with the load converter CLG on the platform provides the load converter CLG, as shown in FIG. 7.

Figure 5:
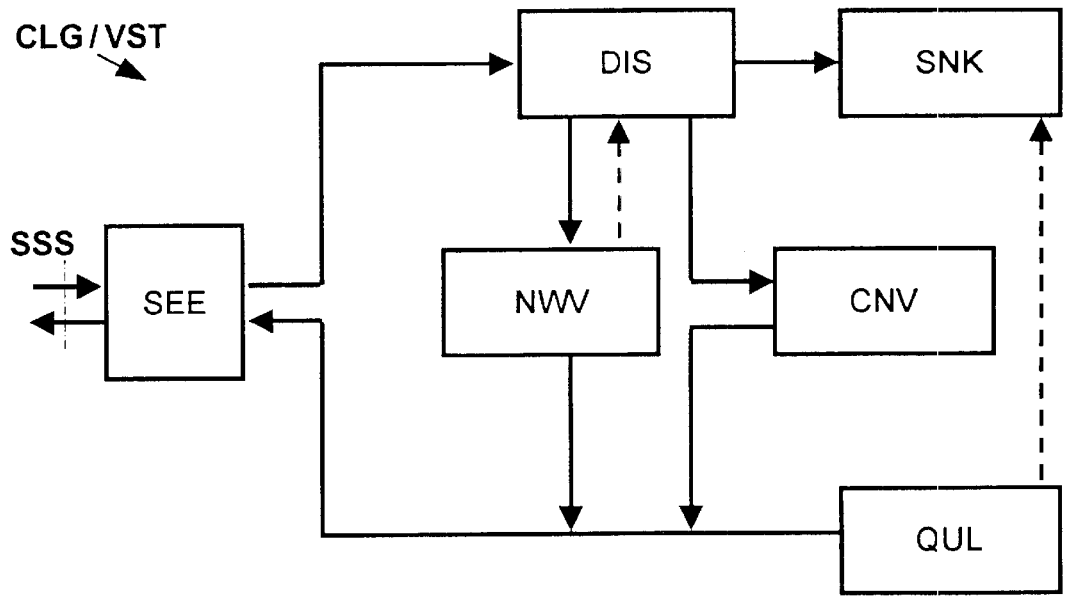
FIG. 5 shows the functional layout of a message converter according to the invention.
Figure 7:
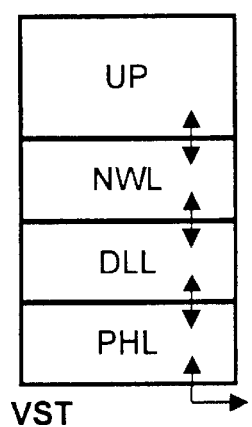
FIG. 7 shows the protocol layer architecture of the message converter according to the invention.
Figure 7:
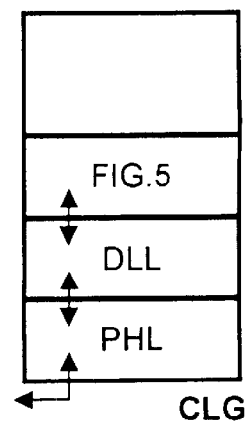

For the switching center VST (left-hand half) FIG. 7 shows the protocol layer architecture of inter-exchange signaling in the CCS7 system: the physical layer PHL comprises the transmission and access functions of a physical signaling channel; the data link layer DLL ensures that the message units being interchanged are transmitted in a manner which protects them against transmission errors in the signaling channel; the network layer NWL contains the functions required for message control and management in the signaling network; and, finally, the user part UP for example the telephone user part of the analog telephone network, contains the service-specific functions for the switching tasks for the communications services. As shown in the right-hand half of FIG. 7, the connections of the network interfaces, which correspond to the physical layer PHL, and the data link layer DLL, are used unchanged in the load converter. The functions of the load converter, which have been described with reference to FIG. 5 and which, as a "rerouting device" reroute the signaling to the converter functions, appear instead of the network layer NWL. There is no interface from the load converter CLG to higher layers (user parts) since all the messages are converted or are received in the message sink SNK. The physical connections to the platform of the load converter CLG thus belong to the switching center VST on the basis of its logic administration, and, although the higher-level layers are set up, they are no longer used by the lower layers.

In other embodiments, the transmitting/receiving device SEE may be provided as a rerouting device, for example as a signal switch, which reroutes the signaling messages sent from the switching center VST from the signaling interface SSS to the load converter CLG and, conversely, reroutes the messages produced or converted in the load converter to the signaling interface SSS. Furthermore, individual components or all the components of the load converter CLG may, for example, be in the form of dedicated assemblies or program modules in a software platform.

What is claimed is:

1. A method for checking the functionality of a switching center to be tested, wherein the switching center is used to produce subscriber connections in a telecommunications network and has at least two switching connections to which, respectively, at least two further switching centers are connected, in each switching connection an intermediate interface is respectively provided for interchanging user information on the subscriber connection with the respectively connected further switching center, the switching center to be tested also having at least one signaling interface via which signaling messages for controlling the subscriber connections and for administering the intermediate interfaces are interchanged, each signaling message having details relating to a respective source and destination switching center, the method comprising the steps of:
receiving original signaling messages which have been transmitted from the switching center to be tested, wherein a point code of the switching center to be tested is used to indicate a source point and destination point of the signaling messages, with each signaling message having a respective address field which includes a respective source code and a respective destination code, and with the switching center to be tested being stated as the source point in the original signaling messages;
converting the original signaling messages in accordance with a first predetermined rule into further respective signaling messages in which the switching center to be tested is stated as the destination point; and
sending the further signaling messages to the switching center to be tested.

2. A method for checking the functionality of a switching center to be tested as claimed in claim 1, wherein the further signaling messages are respectively sent to the switching center to be tested via the respective signaling interface via which the associated original signaling message was received.

3. A method for checking the functionality of a switching center to be tested as claimed in claim 1, wherein the respective further switching center which is uniquely associated with the destination point of the associated original signaling message is stated as the source point in each of the further signaling messages.

4. A method for checking the functionality of a switching center to be tested as claimed in claim 3, wherein the further switching centers are associated with one another in pairs, and wherein the respective further switching center which is uniquely associated with the destination point of the associated original signaling message is stated as the source point in the associated further signaling message.

5. A method for checking the functionality of a switching center to be tested as claimed in claim 4, the method further comprising the step of:
determining addresses of the mutually associated switching centers from one another via an inversion operation.

6. A method for checking the functionality of a switching center to be tested as claimed in claim 3, wherein each of the intermediate interfaces respectively connected to the further switching centers are looped through.

7. A method for checking the functionality of a switching center to be tested as claimed in claim 1, wherein the at least one signaling interface is connected to a signaling network which is independent of the intermediate interfaces.

8. A method for checking the functionality of a switching center to be tested as claimed in claim 1, the method further comprising the steps of:
producing and sending to the switching center to be tested additional signaling messages in which source and destination points which differ from the switching center to be tested are stated;
receiving yet additional signaling messages which have been transmitted from the switching center to be tested and in which source and destination points which differ from the switching center to be tested are stated; and
checking the yet additional signaling messages to determine whether they match previously sent signaling messages.

9. A device for checking the functionality of a switching center to be tested, and for producing subscriber connections in a telecommunications network, the device comprising:
at least one signaling interface to which the switching center to be tested is connected, the signaling interface being set up for interchanging signaling messages between further switching centers for controlling subscriber connections and for administering intermediate interfaces which connect the further switching centers to the switching center to be tested, wherein a point code of the switching center to be tested is used to indicate a source point and destination point of the signaling messages, with each signaling message having a respective address field which includes a respective source code and a respective destination code relating to a respective source and destination switching center;
a transmitting and receiving device for transmitting and receiving the signaling messages via the at least one signaling interface; and
a converter device whose output is supplied to the transmitting and receiving device and to which the signaling messages which have been received by the transmitting and receiving device can be supplied, the converter device converting the original signaling messages in accordance with a first predetermined rule into respective converted signaling messages in each of which the source point of the respective original signaling message is stated as the destination point.

10. A device for checking the functionality of a switching center to be tested as claimed in claim 9, the device further comprising:

a message source whose output is supplied to the transmitting and receiving device, the message source producing signaling messages in which source and destination points which differ from the switching center to be tested are stated;

a message sink for receiving and evaluating signaling messages to determine whether they match previously sent signaling messages; and a discriminator device to which the signaling messages which have been received by the transmitting and receiving device can be supplied, for assigning signaling messages to subsequent devices which process messages, in accordance with a second predetermined rule which differs from the first predetermined rule, using contents of the respective signaling message.

11. A switching center to be tested and which is used to produce subscriber connections in a telecommunications network and which has at least two switching connections to which further switching centers are connected, in each of the switching connections an intermediate interface is provided for interchanging user information on the subscriber connections with a respectively connected further switching center, and has at least one signaling interface via which signaling messages for controlling the subscriber connections and for administering the intermediate interfaces are interchanged, wherein a point code of the switching center to be tested is used to indicate a source point and destination point of the signaling messages, with each signaling message having a respective address field which includes a respective source code and a respective destination code relating to a respective source and destination switching center, the switching center to be tested comprising:

a converter device for converting original signaling messages in accordance with a first predetermined rule into respective converted signaling messages in each of which the source point of the original signaling message is stated as the destination point; and a rerouting device for rerouting signaling messages which are to be sent as the original signaling messages from the signaling interface to the converter device, and for rerouting the converted signaling messages as signaling messages which arrive at the switching center to be tested to the signaling interface.

12. A switching center to be tested as claimed in claim 11, further comprising:

a message source whose output is supplied to the rerouting device for producing signaling messages in which source and destination points which differ from the switching center to be tested are stated;

a message sink for receiving and evaluating signaling messages to determine whether they match previously sent signaling messages; and a discriminator device to which the signaling messages which have been rerouted by the rerouting device can be supplied, for assigning signaling messages to subsequent devices which process messages in accordance with a second predetermined rule which differs from the first predetermined rule, using contents of the respective signaling message.

* * * * *